(No Model.)

W. BURNLEY.
GALVANIC BATTERY.

No. 471,945. Patented Mar. 29, 1892.

Witnesses.
Robert Everett
J. A. Rutherford

Inventor.
William Burnley.
By James L. Norris.
Atty.

UNITED STATES PATENT OFFICE.

WILLIAM BURNLEY, OF NORTH EAST, PENNSYLVANIA.

GALVANIC BATTERY.

SPECIFICATION forming part of Letters Patent No. 471,945, dated March 29, 1892.

Application filed June 13, 1891. Serial No. 396,145. (No model.)

*To all whom it may concern:*

Be it known that I, WILLIAM BURNLEY, a citizen of the United States, residing at North East, in the county of Erie and State of Pennsylvania, have invented new and useful Improvements in Galvanic Batteries, of which the following is a specification.

My invention relates to certain improvements in galvanic batteries, one purpose thereof being to provide a cell having small internal resistance and so organized that the generated gas and the moisture produced by the action of the battery shall not burst the seal, ooze from the seal, or rupture the compounds used in the battery, and which may after a time become partly or wholly solidified.

It is my purpose, also, to provide a galvanic battery of the type ordinarily known as a "dry cell," in which the negative element shall be more or less completely inclosed within a porous cup in which a depolarizing compound is packed, the exciting composition or filling surrounding the porous cup and forming a layer interposed between the open lower end of the porous cup and the bottom of the zinc cup or outer jar.

It is my purpose, also, to provide a battery of the type specified in which the carbon or negative element is partly surrounded by and in contact with a depolarizing composition and partly in contact with the excitant filling, the depolarizing composition being packed within a porous cup constructed of any suitable material having the necessary porosity and rigidity, such as earthenware or any other material having the qualities named.

The invention consists in the several novel features of construction and new combinations of parts hereinafter fully set forth, and then definitely and particularly pointed out in the claims concluding this specification.

To enable others skilled the art to which my invention pertains to make, construct, and use the same, I will proceed to describe a dry cell containing said invention, reference being had for such purpose to the accompanying drawings, in which—

Figure 1:
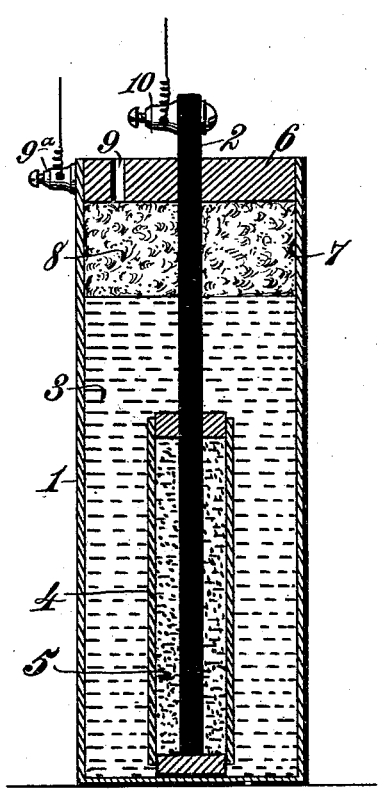
Figure 2:
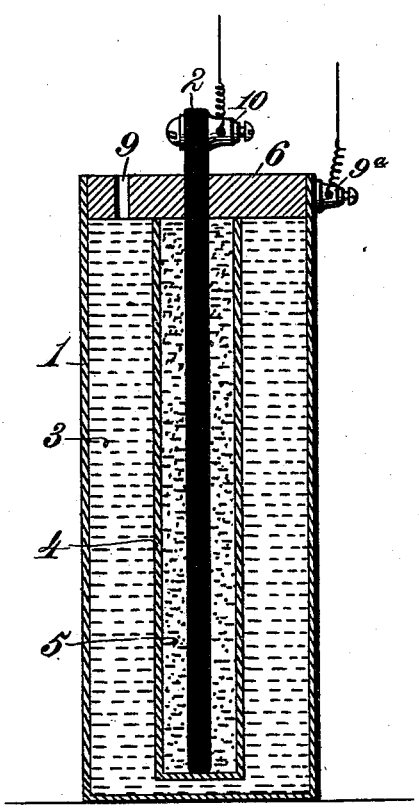

Figure 1 is a central vertical section of a dry cell, showing my invention. Fig. 2 is a similar view showing a slight change in the organization.

In the said drawings the reference-numeral 1 indicates the outer jar of the cell, which is constructed of zinc to form the electro-positive element or pole. The electro-negative pole 2 is of carbon in the form of a plate or bar of any preferred and suitable form.

Within the outer jar 1 is packed the exciting material 3, the nature of which will be more fully described hereinafter, and concentrically arranged within said jar is a porous cup 4, composed of earthenware or of any material having rigid resistance to compression and having the proper degree of porosity. This porous cup is so arranged in the outer jar that its lower end is separated from the bottom by a thin layer of exciting material, which is packed closely around the porous cup and which may rise above the top thereof, as shown in Fig. 1, the porous cup in such cases being of less depth than the outer jar. The electro-negative pole 2 is inserted within the porous cup and extends in all cases above the top of the same and above the top of the outer jar. In the construction shown in Fig. 1 the exciting material will be packed closely around and in contact with that portion of the electro-negative or carbon pole which rises above the porous cup and lies beneath the seal. The bottom of the porous cup is usually open, but the top, although I usually leave the same open also, may be closed by a seal of any suitable kind.

Within the porous cup is packed a depolarizing material 5, the composition of which will be described hereinafter. This material fills the cup and lies against the carbon pole on all sides of the same.

The cell is sealed by a cap of bitumen 6 or by a seal of any other suitable material in the well-known manner. Between the seal 6 and the exciting material is formed a chamber 7 of suitable dimensions, as shown in Fig. 1, within which I may place any absorbent or bibulous material 8—such, for example, as sand, sponge, or other substance—to absorb the fluid which is sometimes formed, and especially when the action of the battery is more than usually exhausting, as when it is upon a short circuit. A small opening 9 is also formed in the seal 6 to permit the escape of gas and ingress of air, though this opening may be omitted without very materially affecting the results sought. I propose, also, in some instances to extend the porous cup upward until its mouth or upper end lies against the under face of the seal. In this construction the mouth of said porous cup will require no separate seal, as it will be closed by the seal on the outer jar. The exciting material, also, will simply be packed around and beneath the porous cup, but will not lie above its top and in contact with the projecting portion of the carbon pole, as in Fig. 1. If preferred, I may close the lower end of the porous cup by a cork plug; but this is not essential so long as a thin layer of the exciting material is provided between the bottom of the zinc or outer jar and the depolarizing material in the porous cup. A binding-post $9^a$ is placed upon the edge of the zinc jar, and a similar fastening 10 is mounted on the carbon pole, these devices being of any form preferred.

The exciting material I prefer to compound by mingling about three parts of plaster-of-paris with two parts of water, three parts of sal-ammoniac, and one part of chloride of zinc. When these materials are mixed, they form a semi-fluid paste or composition, which is poured into the zinc or outer jar. The porous cup is then filled with the depolarizing compound, which preferably consists of peroxide of manganese and carbon, either one or both of which may be reduced to a finely-powdered state and mingled with sal-ammoniac and water. When thoroughly mixed, this compound is placed in the porous cup and closely packed around the carbon pole. The porous cup, with said carbon and filling, is then forced into the mass of exciting material in the zinc or outer jar, the volume or bulk of this semi-fluid mass being measured, so that the displacement by the insertion of the porous cup will raise the exciting material to the necessary height, either to form the chamber below the seal or to contact with the seal, as shown in Figs. 1 and 2, respectively.

The chamber referred to may be varied in depth, and I may omit the absorbent material, the space afforded by said chamber being usually sufficient to receive the generated gases and the small quantities of fluid given off by the action of the battery.

I prefer in some cases to use the perforation in the seal to relieve the pressure consequent upon an undue increase in the liquid held by the capillary cells of the exciting material. The latter after a little time sets and becomes solid or semi-solid, and the accumulation of water, caused by the action of the battery, has been known to rupture the mass, besides the objectionable oozing from the mouth of the jar between the same and the seal.

While I have described the porous cup as being preferably made of unglazed earthenware or similar material, it should be remembered that I contemplate using any substance which will afford a permeable septum or porous wall between the semi-solid exciting material and the depolarizing compound. A fibrous or cellular substance of any suitable kind may be employed; but I do not consider textile fabrics of the ordinary kind suitable for this purpose.

When a plug is used in the bottom of the porous cup, it is evident that it may rest directly upon the bottom of the outer jar, as the plug will effectually isolate the material filling the porous cup from the zinc.

By allowing the exciting-paste to flow over the top of the cup filled with depolarizing material the internal resistance of the cell is diminished by increasing the conductivity, because the action, instead of being confined to the sides and bottom of the porous cup, will also go on through the exciting substance at the top, as the depolarizing substance filling the cup will be in contact with the exciting-paste which covers it.

In case an exciting-paste is used in which acids are held in suspension the top of the porous cup will be filled or covered by a pitch or paraffine plug, and it may also be necessary to limit the porous area of the cup in accordance with the composition of the excitant, in order to prolong the action of the battery to the necessary degree and to give the required current. It should be noted, also, that when the semi-solid exciting material is caused to flow over the top of the porous cup and over the depolarizing material packed therein and when the cell is closed by a seal of wax or bitumen applied directly over the semi-solid exciting-paste the drying effect of the seal is confined to said paste instead of acting upon the depolarizer.

When the depolarizing compound consists of manganese and carbon-dust, the drying effects produced by the seal are very objectionable. As the seal is formed of wax or bitumen, which is usually melted and poured on, the solidified seal retains the heat for some time, and if the depolarizing compound rises to the lower face of the seal the heat of the latter must act directly upon the same.

It is true that when the semi-solid material contains an acid or acids in suspension it may be preferable to run the wax seal over both the depolarizing and exciting compounds and in direct contact with them.

I prefer that the depolarizing material be packed in the porous cup, where it not only surrounds but has contact with the electro-negative element. The effect of this arrangement is beneficial in giving a more nearly constant current, which is probably due to the surface contact of the depolarizing agent with the negative pole, and the fact that the exciting material is separated from the depolarizer by a porous cup or wall.

What I claim is—

1. In a galvanic battery, the combination, with an electro-positive element consisting of an outer containing-jar, of an electro-negative element, a porous cup of less depth than the containing-jar, a depolarizing compound consisting of manganese and carbon packed in said porous cup around that part of the electro-negative element inclosed by said cup, a semi-solid exciting material packed around the porous cup, and a seal formed of suitable wax closing the mouth of the outer jar, substantially as described.

2. In a galvanic battery, the combination, with an electro-negative and electro-positive element or pole, of a porous cup inclosing the lower portion of the electro-negative pole, a depolarizing material packed in the porous cup and contacting with the negative pole, and an exciting material in the form of paste or semi-solid composition packed in the electro-positive element, which is formed to contain the same, said material being beneath, around, and above the porous cup and having contact with the upper portion of the electro-negative pole, substantially as described.

3. In a galvanic battery, the combination, with an electro-positive element having the form of a containing cell or jar, of a porous cup arranged concentrically therein and having less depth, an electro-negative element having its lower portion lying in the porous cup and rising above the top of the outer jar, and a semi-solid exciting paste or material packed in the outer jar around, beneath, and above the porous cup and having contact with that part of the electro-negative element above the top of the porous cup, a chamber being provided between the exciting material and the seal, substantially as described.

4. In a galvanic battery, the combination, with an electro-positive element constituting an outer jar, of an electro-negative element, a porous cup inclosing the lower end of the negative element, which rises above the top of the outer jar, a depolarizing material packed in the porous cup, and a semi-solid exciting paste or material packed in the outer jar beneath the open lower end of the porous cup around and above the same and contacting with the negative element above the porous cup, a chamber being provided between the seal and the top of the exciting material to be filled with an absorbent, a perforation being formed in the seal, substantially as described.

In testimony whereof I have hereunto set my hand and affixed my seal in presence of two subscribing witnesses.

WILLIAM BURNLEY. [L. S.]

Witnesses:
LIBBIE E. BURNLEY,
G. A. HAMPSON.